UNITED STATES PATENT OFFICE.

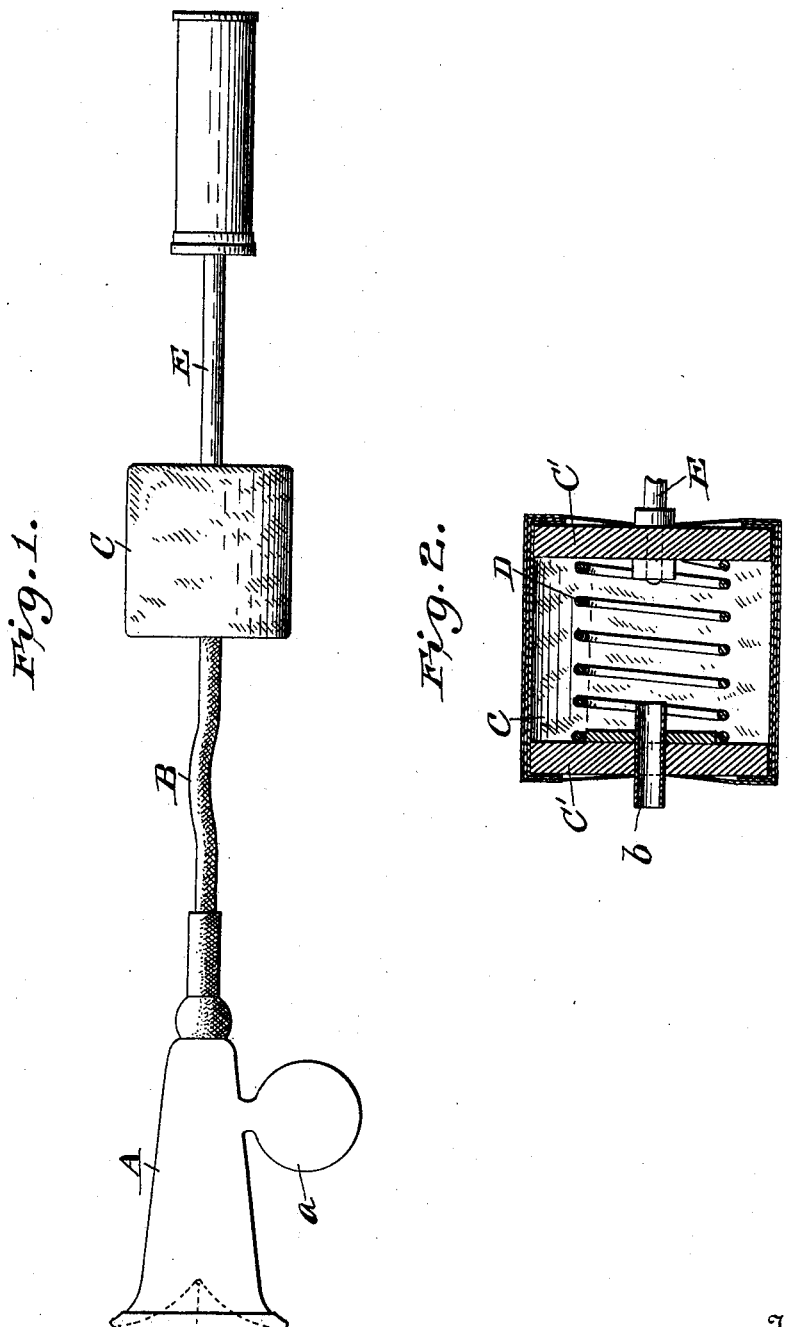

JOSEPH H. HOOVER, OF WATERLOO, IOWA.

BREAST-PUMP.

SPECIFICATION forming part of Letters Patent No. 603,564, dated May 3, 1898.

Application filed August 9, 1897. Serial No. 647,604. (No model.)

*To all whom it may concern:*

Be it known that I, JOSEPH H. HOOVER, a citizen of the United States, residing at Waterloo, in the county of Black Hawk and State of Iowa, have invented certain new and useful Improvements in Breast-Pumps, of which the following is a specification.

My invention relates to breast-pumps, and has for its object to provide a breast-pump having a collapsible air-chamber interposed between the means used for exhausting the air from said air-chamber and the nipple inclosed by the rubber shield, which is generally used thereon, said air-chamber being held normally distended by a spiral spring.

Pumps for drawing milk from the human breast have usually consisted of a flared or funnel-shaped glass tube having a cup or extension formed on the circumference thereof to receive the milk when drawn from the breast, the flared end of the tube having drawn thereover the margins of a perforated nipple-shield, the opposite end of the flared tube having attached directly thereto or connected therewith by a rubber tube a collapsible rubber bulb. The suction whereby the milk is drawn from the breast and collected in the cup is produced by collapsing or flattening the rubber bulb with the fingers and then releasing it and permitting it to resume its normal shape, it in so doing exhausting the air in that portion of the apparatus between the position it holds and the nipple and causing the milk to flow from the latter. Instead of using the collapsible rubber bulb the suction has been produced by creating a vacuum in the apparatus either by means of an air-exhaust pump or by placing the end of the connecting-tube in the mouth and drawing the air out of the tube and the cup provided to hold the milk. The direct withdrawal of the air by any of these means often results in pain to the person on whom the pump is being used, the action of none of the devices described being uniform, but varying suddenly between extremes. Then, too, the pulsating movement of the sucking infant, which produces a natural flow of milk, is lacking when such devices are used. The purpose of my invention is to avoid all of these objectionable features, the object aimed at being to provide a breast-pump not so sudden in its action as to produce pain when the breast is distended and sore and at the same time produce a continuous flow of milk accompanied with the pulsating movement which occurs when an infant is at the breast. These objects I accomplish in the manner and by the means hereinafter more fully pointed out and described in detail, reference being made to the accompanying drawings, in which similar letters indicate corresponding parts in both figures of the drawings.

Figure 1 is a top plan view of my improved breast-pump. Fig. 2 is a central longitudinal section of the air-chamber.

My invention consists of a flared or funnel-shaped tube A, provided with a milk cup or receptacle $a$, formed on the circumference thereof, the edges of a perforated nipple-shield $a'$ in common use being drawn over the flared end of said tube A. On the small end of said tube A a flexible tube B, preferably of rubber, is removably secured. The other end of said flexible tube B is removably secured to a rigid tube $b$, secured in one of the heads C' of a collapsible air-chamber C, of cylindrical shape, covered with rubber or other air-tight material, which may be lined with thin cloth and covered with a silk bag drawn together at each end over said circular heads C' C', said air-chamber C having circular heads C' C', to which said air-tight covering is secured by rubber-cement or any other suitable means of making said air-chamber C air-tight. The circular heads C' C' of said air-chamber C are held apart and said air-chamber C distended by a spiral spring D, placed in said air-chamber C, between said circular heads C' C', to which heads said spiral spring is properly secured. In the center of said circular heads C' C' of said air-chamber C are rigidly secured two small tubes $b$ $b$, opening at one end of said tubes $b$ $b$ into said air-chamber C and at the other end of said tubes $b$ $b$ outside said chamber C. On one of said tubes $b$ $b$ is removably secured, as before stated, one end of the flexible tube B, and on the other of said tubes $b$ $b$ is rigidly secured one end of a tube E, preferably of metal, the other end of which tube E is attached to an air-exhaust pump of the ordinary pattern.

The form of the air-chamber C is not material to my invention, and forms other than cylindrical may be used.

The operation of my improved breast-pump is as follows: When all of the parts are in position, the rubber shield is placed over the nipple of the breast, the milk-receptacle on the flared tube being placed so that the milk as it is drawn from the breast will flow therein. The air in the air-chamber, the flared tube, and the milk-receptacle is then partly withdrawn by means of the air-exhaust pump, the milk flowing from the breast as the air-pressure within the flared tube is removed. When the air is withdrawn from the air-chamber, the latter collapses, but is again distended gradually by the tension of the spring as the milk flows from the nipple and in part occupies the space which had been occupied by the displaced air. Though the flow of milk is continuous when the movement of the air-pump is regular, the degree of the tension is intermittent, the spring acting with greatest force when compressed, its force gradually decreasing as it resumes its normal shape. This variation relieves the constant pull on the breast that would take place if the action was direct, as would be the case if no collapsible air-chamber were interposed.

I am aware that it is not new to provide an air-chamber in cow-milking machinery which is kept normally distended by means of a weight attached to the lower end thereof, the opposite end being suspended from a fixed support, and I do not therefore broadly claim such construction as my invention in this application; but I am not aware that the use of a spiral spring or its equivalent for keeping a collapsible air-chamber distended was known prior to my invention thereof. By the use of a spring the tension is increased as the air is exhausted and the spring is compressed and decreased as the spring resumes its normal shape, which by the use of weights the tension is increased slightly by the momentum acquired by the descending weight as the air-chamber is distended.

Having thus described my invention, what I claim as new, and desire to secure by Letters Patent, is—

1. A breast-pump having a collapsible air-chamber, normally distended by a spiral spring placed within said air-chamber between the heads of said chamber, interposed between the milk tube and receptacle and an air-exhaust pump, substantially as shown and described.

2. A breast-pump consisting of a flared tube having a milk-receptacle formed on its circumference; a perforated nipple-shield secured on the flared end of said tube; a collapsible air-chamber connected with said flared tube, said collapsible air-chamber being normally distended by a spiral spring interposed between the heads of said air-chamber; and an air-exhaust pump distinct from but connected with said air-chamber, substantially as shown and described.

3. A breast-pump consisting of a flared tube having a milk-receptacle formed on its circumference; a perforated nipple-shield secured on the flared end of said tube; a flexible tube attached, at one end, to the small end of said flared tube and, at the other end, to a collapsible air-chamber; a collapsible air-chamber normally distended by a spiral spring interposed between the heads of said air-chamber; a rigid tube connecting said air-chamber and an air-exhaust pump; and an air-exhaust pump distinct from but connected with said air-chamber, substantially as shown and described.

4. In a breast-pump, the combination with a perforated nipple-shield and a milk-receptacle, of a collapsible air-chamber, normally distended by a spiral spring interposed between the heads of said chamber, and an air-exhaust pump distinct from but connected with said air-chamber, substantially as shown and described.

5. In a breast-pump, the combination with a tube provided with a milk-receptacle and having a perforated nipple-shield attached to said tube, of a collapsible air-chamber, normally distended by a spiral spring interposed between the heads of said air-chamber, said air-chamber being connected with said tube, and an air-exhaust pump distinct from but connected with said air-chamber, substantially as shown and described.

In testimony whereof I hereto affix my signature in the presence of two witnesses.

JOSEPH H. HOOVER.

Witnesses:
  S. B. REED,
  E. V. HAYDEN.